(12) United States Patent
McCollough et al.

(10) Patent No.: US 12,172,641 B2
(45) Date of Patent: Dec. 24, 2024

(54) ELECTRIFIED VEHICLE CONFIGURED TO SELECTIVELY INCREASE ENERGY RECOVERY THRESHOLD AND CORRESPONDING METHOD

(71) Applicant: Ford Global Technologies, LLC, Dearborn, MI (US)

(72) Inventors: Alexander McCollough, Northville, MI (US); Zachary Konchan, Berkley, MI (US); George Taylor Dickinson, Livonia, MI (US)

( * ) Notice: Subject to any disclaimer, the term of this patent is extended or adjusted under 35 U.S.C. 154(b) by 1297 days.

(21) Appl. No.: 16/412,853

(22) Filed: May 15, 2019

(65) Prior Publication Data

US 2020/0361469 A1    Nov. 19, 2020

(51) Int. Cl.
| | |
|---|---|
| *B60W 30/18* | (2012.01) |
| *B60L 7/10* | (2006.01) |
| *B60W 20/00* | (2016.01) |
| *B60W 40/13* | (2012.01) |
| *B60K 6/365* | (2007.10) |
| *B60K 6/40* | (2007.10) |

(52) U.S. Cl.
CPC ......... *B60W 30/18127* (2013.01); *B60L 7/10* (2013.01); *B60W 20/00* (2013.01); *B60W 40/13* (2013.01); *B60K 6/365* (2013.01); *B60K 6/40* (2013.01); *B60W 2300/14* (2013.01); *B60W 2530/10* (2013.01); *B60W 2720/106* (2013.01); *B60Y 2200/91* (2013.01); *B60Y 2200/92* (2013.01); *B60Y 2300/18125* (2013.01)

(58) Field of Classification Search
CPC .......... B60K 6/445; B60K 6/40; B60K 6/365; B60L 2240/26; B60L 2240/463; B60L 7/18; B60L 7/10; B60W 30/18127; B60W 40/13; B60W 20/00; B60W 2300/14; B60W 2530/10; B60W 2720/106; B60W 2050/0075; B60W 2710/083; B60W 2530/203; B60Y 2200/91; B60Y 2200/92; B60Y 2300/18125
USPC .......................................................... 702/22
See application file for complete search history.

(56) References Cited

U.S. PATENT DOCUMENTS

| | | |
|---|---|---|
| 4,242,617 A | 12/1980 | Jennings |
| 6,516,925 B1 | 2/2003 | Napier et al. |
| (Continued) | | |

FOREIGN PATENT DOCUMENTS

| | | |
|---|---|---|
| CN | 101905659 B | 2/2014 |
| WO | 2017140626 A1 | 8/2017 |

OTHER PUBLICATIONS

Bjoernsson, Lars-Henrik & Karlsson, Sten, "The Potential for Brake Energy Regeneration Under Swedish Conditions", Elsevier, Applied Energy 168 (2016) pp. 75-84.

*Primary Examiner* — Abby J Flynn
*Assistant Examiner* — Sean Patrick Reidy
(74) *Attorney, Agent, or Firm* — David B. Kelley; Carlson, Gaskey & Olds, P.C.

(57) ABSTRACT

This disclosure relates to an electrified vehicle configured to selectively increase an energy recovery threshold and a corresponding method. In particular, an example electrified vehicle includes an energy recovery mechanism configured to apply a negative wheel torque up to a negative wheel torque threshold. The electrified vehicle also includes a controller configured to selectively increase the negative wheel torque threshold based on a mass of the electrified vehicle.

17 Claims, 2 Drawing Sheets

(56) References Cited

U.S. PATENT DOCUMENTS

| | | |
|---|---|---|
| 7,894,967 B2 | 2/2011 | Crombez |
| 8,215,436 B2 | 7/2012 | DeGrave et al. |
| 8,700,284 B2 | 4/2014 | Wojtkowicz et al. |
| 2006/0287798 A1* | 12/2006 | Inoue .................. B60L 15/2072 |
| | | 701/70 |
| 2011/0251770 A1* | 10/2011 | Minarcin .................. B60T 1/10 |
| | | 701/71 |
| 2014/0297147 A1* | 10/2014 | Newman .................. B60T 1/10 |
| | | 701/70 |
| 2015/0283920 A1* | 10/2015 | Toyota ...................... B60L 7/24 |
| | | 903/945 |
| 2019/0039595 A1* | 2/2019 | Hawley ............... B60L 15/2018 |
| 2020/0070829 A1* | 3/2020 | Martinez ............... B60W 30/20 |

* cited by examiner

ELECTRIFIED VEHICLE CONFIGURED TO SELECTIVELY INCREASE ENERGY RECOVERY THRESHOLD AND CORRESPONDING METHOD

TECHNICAL FIELD

This disclosure relates to an electrified vehicle configured to selectively increase an energy recovery threshold and a corresponding method.

BACKGROUND

Generally, electrified vehicles are selectively driven using one or more battery-powered electric machines. Electric machines can drive electrified vehicles instead of, or in addition to, an internal combustion engine. Example electrified vehicles include all-electric vehicles, hybrid electric vehicles (HEVs), plug-in hybrid electric vehicles (PHEVs), fuel cell vehicles, and battery electric vehicles (BEVs). Some electrified vehicles use energy recovery mechanisms, such as regenerative braking systems, to recover energy. The recovered energy is typically stored within a battery until the energy is used to power the electric machines.

SUMMARY

An electrified vehicle according to an exemplary aspect of the present disclosure includes, among other things, an energy recovery mechanism configured to apply a negative wheel torque up to a negative wheel torque threshold, and a controller configured to selectively increase the negative wheel torque threshold based on a mass of the electrified vehicle.

In a further non-limiting embodiment of the foregoing electrified vehicle, the mass of the electrified vehicle is an effective mass of the electrified vehicle.

In a further non-limiting embodiment of any of the foregoing electrified vehicles, the controller is configured to estimate the effective mass of the electrified vehicle.

In a further non-limiting embodiment of any of the foregoing electrified vehicles, the controller is configured to estimate the effective mass by estimating of the mass of the electrified vehicle and estimating the mass of a load towed by the electrified vehicle.

In a further non-limiting embodiment of any of the foregoing electrified vehicles, the controller is configured to increase the negative wheel torque applied by the energy recovery mechanism when an estimate of the effective mass of the electrified vehicle exceeds a predefined value.

In a further non-limiting embodiment of any of the foregoing electrified vehicles, the predefined value is an equivalent test weight.

In a further non-limiting embodiment of any of the foregoing electrified vehicles, the controller is configured to estimate the effective mass of the electrified vehicle by comparing a negative wheel torque level to a level of deceleration of the electrified vehicle.

In a further non-limiting embodiment of any of the foregoing electrified vehicles, when estimating the effective mass of the electrified vehicle, the controller considers whether a trailer is attached to the electrified vehicle.

In a further non-limiting embodiment of any of the foregoing electrified vehicles, the controller is configured to estimate the effective mass of the electrified vehicle by interpreting signals from at least one load sensor mounted to the electrified vehicle.

In a further non-limiting embodiment of any of the foregoing electrified vehicles, the negative wheel torque threshold is based on a predefined maximum deceleration rate of the electrified vehicle.

In a further non-limiting embodiment of any of the foregoing electrified vehicles, the energy recovery mechanism is configured to apply a negative torque to at least one wheel of the electrified vehicle.

In a further non-limiting embodiment of any of the foregoing electrified vehicles, the energy recovery mechanism is a regenerative braking system configured to selectively resist rotation of at least one wheel of the electrified vehicle.

In a further non-limiting embodiment of any of the foregoing electrified vehicles, the electrified vehicle includes a battery pack, and the controller is configured to selectively direct power from the energy recovery mechanism to the battery pack.

In a further non-limiting embodiment of any of the foregoing electrified vehicles, the electrified vehicle is a hybrid electric vehicle.

A method according to an exemplary aspect of the present disclosure includes, among other things, applying a negative wheel torque from an energy recovery mechanism to at least one wheel of an electrified vehicle at a level up to a negative wheel torque threshold, and increasing the negative wheel torque threshold based on a mass of the electrified vehicle.

In a further non-limiting embodiment of the foregoing method, the method includes estimating an effective mass of the electrified vehicle. Further, the increasing step includes increasing the negative wheel torque threshold based on the estimated effective mass of the electrified vehicle.

In a further non-limiting embodiment of any of the foregoing methods, the estimating step includes comparing a negative wheel torque level to a level of deceleration of the electrified vehicle.

In a further non-limiting embodiment of any of the foregoing methods, the estimating step includes determining whether a trailer is attached to the electrified vehicle.

In a further non-limiting embodiment of any of the foregoing methods, the increasing step occurs when an effective mass of the electrified vehicle has increased relative to an equivalent test weight.

In a further non-limiting embodiment of any of the foregoing methods, the electrified vehicle is a hybrid electric vehicle.

DETAILED DESCRIPTION

This disclosure relates to an electrified vehicle configured to selectively increase an energy recovery threshold and a corresponding method. In particular, an example electrified vehicle includes an energy recovery mechanism configured to apply a negative wheel torque up to a negative wheel torque threshold. The electrified vehicle also includes a controller configured to selectively increase the negative wheel torque threshold based on a mass of the electrified vehicle. This disclosure has a number of other benefits which will be appreciated from the following description. Among them, this disclosure provides an increased availability of regenerative braking, which lessens the degradation of the vehicle's friction brakes, while maintaining stability and without causing an undue increase in noise and/or vibrations. This disclosure may also improve fuel economy.

Figure 1:
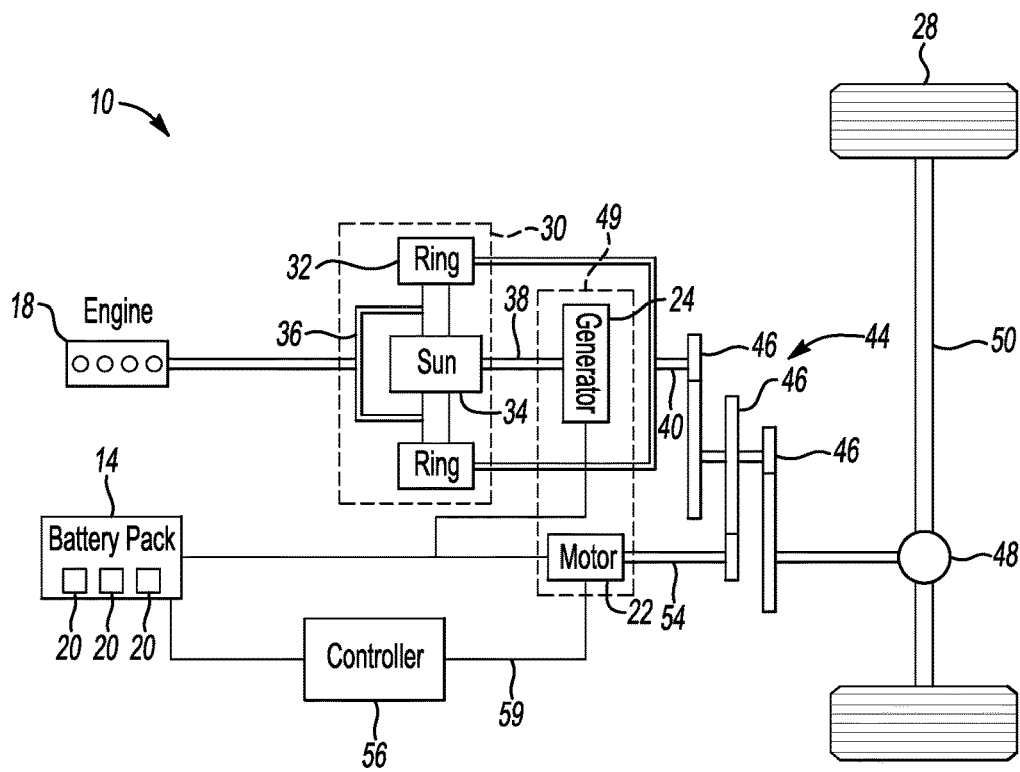
FIG. 1 schematically illustrates an example powertrain of an electrified vehicle.
Figure 2:
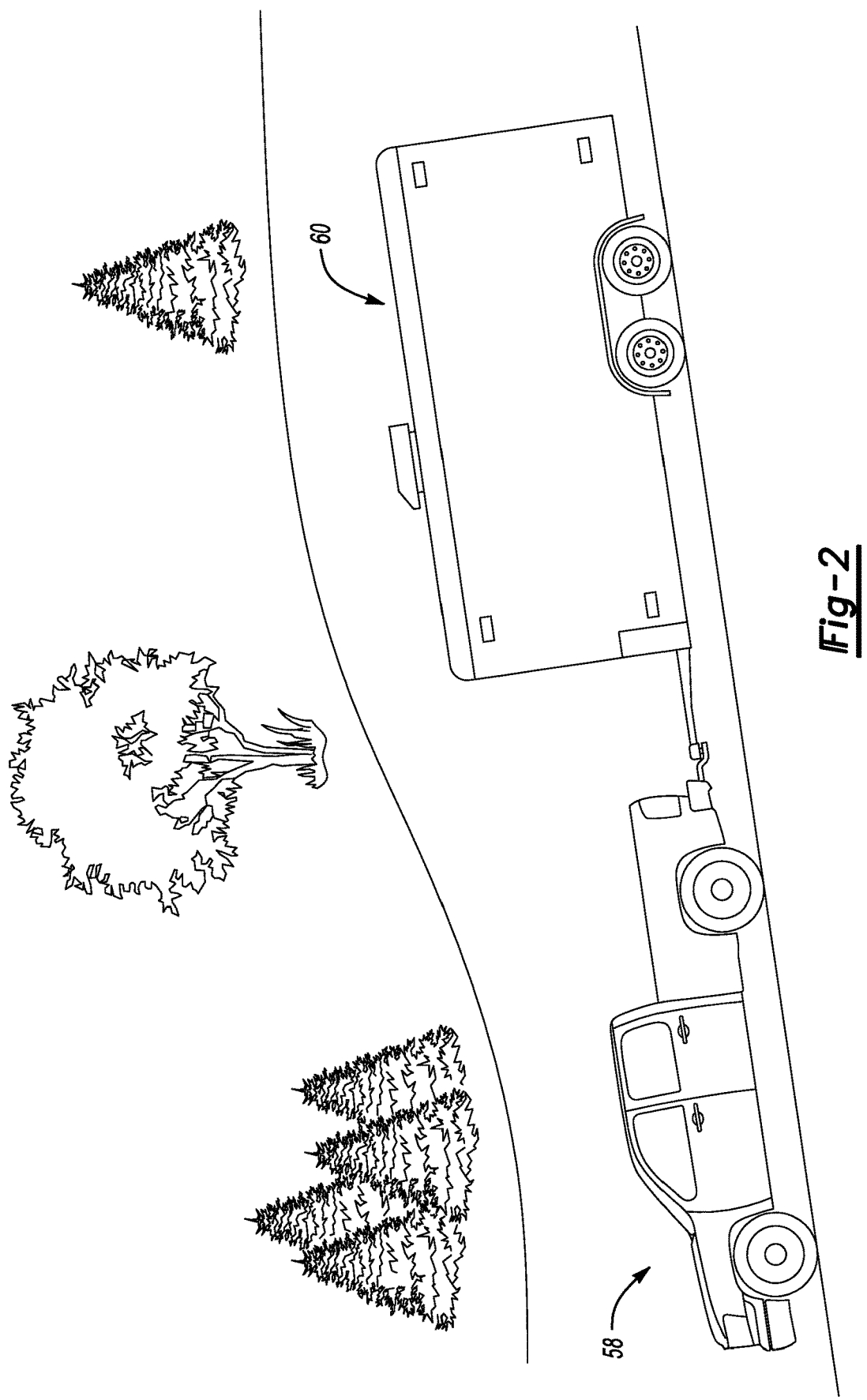
FIG. 2 illustrates an electrified vehicle towing a trailer while descending a grade.

FIG. 1 schematically illustrates an example powertrain 10 for a hybrid electric vehicle (HEV), such as the vehicle 58 (FIG. 2). The powertrain 10 may be referred to as a hybrid transmission. Although depicted as an HEV, it should be understood that the concepts described herein are not limited to HEVs and could extend to other electrified vehicles, including, but not limited to, plug-in hybrid electric vehicles (PHEVs), battery electric vehicles (BEVs) and fuel cell vehicles (FCVs). This disclosure also extends to various types of hybrid vehicles including full hybrids, parallel hybrids, series hybrids, mild hybrids, micro hybrids, and plug-in hybrids. Further, although the vehicle 58 is depicted as a pickup truck in FIG. 2, this disclosure is not limited to pickup trucks, and extends to other electrified vehicles such as sport utility vehicles (SUVs), sedans, vans, etc.

With continued reference to FIG. 1, a battery pack 14, sometimes referred to as a vehicle battery or simply a battery, and an internal combustion engine 18 selectively operate with the powertrain 10. The battery pack 14 includes arrays 20 of rechargeable battery cells. In this disclosure, any reference to the battery pack 14 also includes, where appropriate, the arrays 20 of battery cells. The powertrain 10 includes a motor 22 and a generator 24, both of which are types of electric machines. The motor 22 and generator 24 may be separate or may have the form of a combined motor-generator.

In the embodiment of FIG. 1, the powertrain 10 is a power-split transmission that employs a first drive system and a second drive system. The first and second drive systems generate torque to drive one or more sets of vehicle drive wheels 28. The first drive system includes a combination of the engine 18 and the generator 24. The second drive system includes at least the motor 22, the generator 24, and the battery pack 14. The motor 22 and the generator 24 are portions of an electric drive system of the powertrain 10.

The engine 18 and the generator 24 may be connected through a power transfer unit 30, such as a planetary gear set. Other types of power transfer units, including other gear sets and transmissions, can be used to connect the engine 18 to the generator 24. In one non-limiting embodiment, the power transfer unit 30 is a planetary gear set that includes a ring gear 32, a sun gear 34, and a carrier assembly 36.

The generator 24 can be driven by the engine 18 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 18, for example, to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28. The motor 22 can be selectively employed to drive the vehicle drive wheels 28 by outputting torque to a shaft 54 that is also connected to the second power transfer unit 44.

Further, in this embodiment, the motor 22 and the generator 24 cooperate as part of an energy recovery mechanism 49, which in this example is a regenerative braking system, in which both the motor 22 and the generator 24 can be employed as motors to output torque. For example, the motor 22 and the generator 24 can each output electrical power to recharge cells of the battery pack 14.

The powertrain 10 may additionally include a controller 56 for monitoring and/or controlling various aspects of the powertrain 10 and associated vehicle 58. For example, the controller 56 may communicate with the electric drive system, the power transfer units 30, 44, and/or other components to monitor various conditions of the vehicle 58, control the vehicle 58, or both. The controller 56 includes electronics, software, or both, to perform the necessary control functions for operating the vehicle 58. In one non-limiting embodiment, the controller 56 is a combination vehicle system controller and powertrain control module (VSC/PCM). Although it is shown as a single device, the controller 56 may include multiple controllers in the form of multiple hardware devices, or multiple software controllers within one or more hardware devices. A controller area network (CAN) 59, illustrated schematically, allows the controller 56 to communicate with the various components of the vehicle 58.

The example vehicle 58 is a hybrid-electric vehicle having a powertrain, such as the powertrain 10. In another particular example, the vehicle 58 is an all-electric vehicle incorporating a regenerative braking system. In still other examples, the vehicle could be a vehicle incorporating an energy recovery mechanism other than a regenerative braking system.

As mentioned above, the motor 22 and the generator 24 cooperate as part of a regenerative braking system. The regenerative braking system, again, is a type of energy recovery mechanism 49. The regenerative braking system can be used to reduce, or maintain, the speed of the vehicle, while recovering energy and generating power for use by the vehicle 58.

Typically, the energy recovered by the regenerative braking system is stored in the battery pack 14. The regenerative braking system is used to apply a negative torque to the wheels 28 to maintain a speed, decelerate, or to limit acceleration of the vehicle 58 down a grade, for example. Depending on various conditions, such as desired vehicle speed, the steepness of the grade, etc., the vehicle 58 may vary a level of negative torque applied to the wheels by the energy recovery mechanism 49. In general, the applied level of negative torque is proportional to the power generated by the regenerative braking system.

In order to prevent unwanted behaviors of the vehicle 58, such as vibrations, noise, etc., the level of negative torque applied to the wheels 28 by the energy recovery mechanism 49 is limited to an energy recovery threshold, namely a negative wheel torque threshold. The negative wheel torque threshold is a level of negative wheel torque below which the energy recovery mechanism 49 will not cause the vehicle 58 to exhibit unwanted behaviors such as undue vibrations and/or noise. In this sense, the negative wheel torque threshold may be considered a capacity or upper limit. The negative wheel torque threshold corresponds directly or proportionally to a maximum regenerative braking threshold. The negative wheel torque threshold also corresponds directly or proportionally to a predefined maximum desired deceleration rate of the vehicle 58.

The negative wheel torque threshold may originally be a predefined value stored in the controller 56 and set by the manufacturer of the vehicle 58. In particular, the manufacturer may originally set the negative wheel torque threshold based on a designed mass of the vehicle 58. In a further example, the negative wheel torque threshold may be based on an equivalent test weight (ETW; sometimes also referred to as equivalent test weight class, or EWTC), which is weight/mass of the vehicle 58 as specified by the manufacturer, including the vehicle's chassis, body, engine, engine fluids, fuel, accessories, driver, passengers, and cargo but excluding that of any trailers. While ETW is mentioned herein, other weight/mass ratings may be used, such as gross vehicle weight rating (GVWR).

In this disclosure, the controller 56 is configured to selectively increase the negative wheel torque threshold based on a mass of the electrified vehicle 58. In particular, in some conditions, the energy recovery mechanism 49 can apply negative wheel torque in excess of the original, manufacturer-set negative wheel torque threshold while maintaining stability and without the vehicle 58 experiencing unwanted vehicle behaviors such as increased noise and/or vibrations. Such conditions include when the mass of the vehicle 58 has increased above a certain level, such as above the ETW.

FIG. 2 is representative of an example condition where the vehicle 58 may be able to apply negative wheel torque in excess of the original, manufacturer-set negative wheel torque threshold. In particular, in FIG. 2, the vehicle 58 is descending a relatively steep grade and is towing a trailer 60. The mass of the trailer 60 contributes to the ability of the vehicle 58 to resist unwanted vehicle behaviors as regenerative braking and negative wheel torque levels increase. In such conditions, the controller 56 is configured to increase the negative wheel torque threshold dynamically and in real time.

The controller 56 may selectively increase the negative wheel torque in conditions other than those shown in FIG. 2. For instance, instead of a trailer 60, the vehicle 58 could be carrying a relatively heavy load in the passenger cabin or, in the case of a pickup truck, in the bed. Further, the vehicle 58 need not be descending a grade. Other example conditions include the vehicle 58 coasting or decelerating from a relatively high speed on a relatively flat grade. This disclosure extends to other conditions where regenerative braking may occur.

Figure 3:
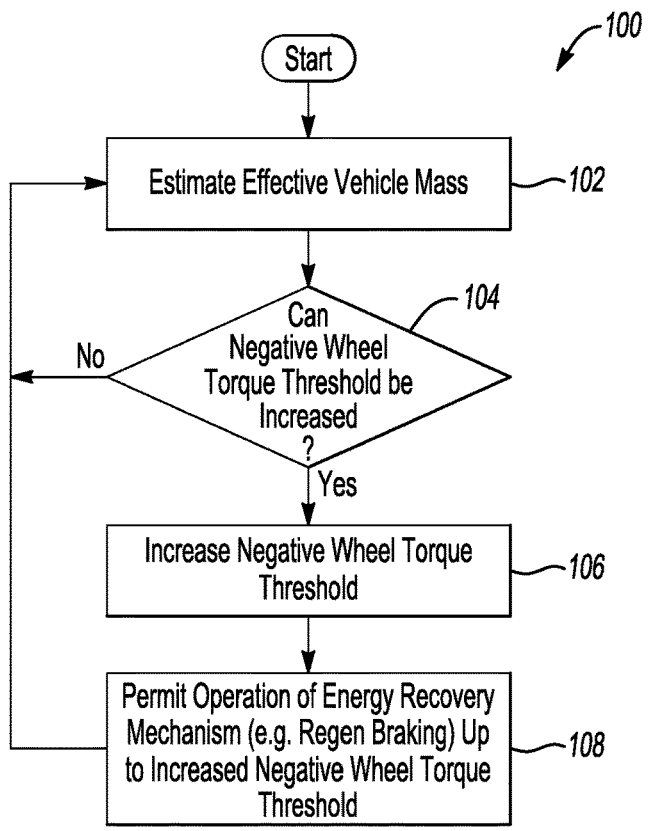
FIG. 3 is a flow chart representative of an example method of this disclosure.

FIG. 3 is a flow chart representative of an example method 100 of this disclosure. Various aspects of the vehicle 58, including an example control logic of the controller 56, will now be described with reference to FIG. 3 and with continued reference to FIGS. 1 and 2.

The method 100 begins, at 102, with the controller 56 determining the mass of the vehicle 58. In particular, the controller 56 is configured to estimate an effective mass of the vehicle 58. The effective mass of the vehicle 58 is inclusive of the mass of any loads being pulled, in other words towed, by the vehicle 58. In the embodiment of FIG. 2, the effective mass of the vehicle 58 includes and accounts for the estimated mass of the vehicle 58 and the estimated mass of the trailer 60 and/or any other towed load.

The controller 56 is configured to estimate the effective mass of the vehicle 58 using one or more techniques. In one example the controller 56 is configured to estimate the effective mass of the vehicle 58 by comparing a negative wheel torque level to a level of deceleration of the vehicle 58. In particular, the controller 56 may include an algorithm or a look up table, as examples, configured to correlate a negative wheel torque level to an expected level of vehicle deceleration. For instance, if a particular negative wheel torque level is being applied and the vehicle 58 is not decelerating as much as expected, for example, this is indicative of an increase in effective vehicle mass. The controller 56 can relatively accurately estimate the effective mass of the vehicle 58 using the algorithm and/or look up table.

The controller 56 may also consider other information, such as whether a trailer 60 is connected to the vehicle 58. In particular, the controller 56 may receive a signal indicating that an electrical coupling associated with a trailer 60 has been plugged into the vehicle 58. The controller 56 may also be in communication with one or more load sensors configured to generate a signal indicative of a load of the vehicle 58. The sensors may be strain gauges mounted to springs of the vehicle 58, for example. The controller 56 is configured to interpret the signals from such sensors to estimate the effective mass of the vehicle 58. This disclosure extends to other techniques for estimating the effective mass of the vehicle 58.

At 104, with the effective mass of the vehicle 58 estimated, the controller 56 determines whether the negative wheel torque threshold can be increased. In particular, the controller 56 determines whether the original, manufacturer-set negative wheel torque threshold can be increased for the period of time during which the vehicle 58 has an increased estimated effective mass. In one particular example, the controller 56 determines that the negative wheel torque threshold may be increased when the estimated effective vehicle mass exceeds the ETW of the vehicle 58. In another example, the controller 56 determines that the negative wheel torque threshold may be raised when the estimated effective vehicle mass exceeds the ETW of the vehicle 58 by a predetermined amount. Otherwise, if the effective vehicle mass is at or below ETW, as examples, the controller 56 determines that the negative wheel torque threshold should not be increased.

With reference to the example of FIG. 2, the controller 56, at step 104, would determine that the estimated effective mass of the vehicle 58 exceeds the ETW because the vehicle 58 is pulling a relatively heavy trailer 60. As such, the negative wheel torque threshold may be increased, and the energy recovery mechanism 49 may apply an increased level of negative wheel torque to the wheels 28 without the vehicle 58 experiencing unwanted vehicle behaviors.

At 106, when the controller 56 determines that the negative wheel torque threshold can be increased, the controller 56 increases the negative wheel torque threshold. The increased negative wheel torque threshold corresponds to a level of negative wheel torque that will not cause the vehicle 58, at the estimated effective mass, to experience unwanted behaviors such as undue noise and/or vibration. In a particular example, the controller 56 raises the negative wheel torque threshold to a level in proportion to the estimated effective mass of the vehicle 58. The controller 56 may determine the precise increase to the negative wheel torque threshold based on an algorithm or a look up table, as examples.

At 108, with the negative wheel torque threshold raised, the controller 56 sends various instructions to the powertrain 10 of the vehicle 58 to permit the energy recovery mechanism 49 to apply negative wheel torque to the wheels 28 up to the increased negative wheel torque threshold set in step 106. In particular, the controller 56 sends instructions to permit regenerative braking up to the increased negative wheel torque threshold. The method 100 continues, adjusting the negative wheel torque threshold as necessary based on changes to the estimated effective mass of the vehicle 58.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
    an energy recovery mechanism configured to apply a negative wheel torque up to a negative wheel torque threshold; and
    a controller configured to estimate an effective mass of the electrified vehicle and further configured to increase the negative wheel torque threshold in excess of an original, manufacturer-set negative wheel torque threshold when the effective mass of the electrified vehicle exceeds a mass threshold,
    wherein the energy recovery mechanism is a regenerative braking system configured to selectively resist rotation of at least one wheel of the electrified vehicle.

2. The electrified vehicle as recited in claim 1, wherein the controller is configured to estimate the effective mass by estimating the mass of the electrified vehicle and estimating the mass of a load towed by the electrified vehicle.

3. The electrified vehicle as recited in claim 1, wherein the mass threshold is either (1) an equivalent test weight of the electrified vehicle or (2) a predetermined amount above the equivalent test weight.

4. The electrified vehicle as recited in claim 1, wherein the controller is configured to estimate the effective mass of the electrified vehicle by comparing a negative wheel torque level to a level of deceleration of the electrified vehicle.

5. The electrified vehicle as recited in claim 1, wherein, when estimating the effective mass of the electrified vehicle, the controller considers whether a trailer is attached to the electrified vehicle.

6. The electrified vehicle as recited in claim 1, wherein the controller is configured to estimate the effective mass of the electrified vehicle by interpreting signals from at least one load sensor mounted to the electrified vehicle.

7. The electrified vehicle as recited in claim 1, wherein the negative wheel torque threshold is based on a predefined maximum deceleration rate of the electrified vehicle.

8. The electrified vehicle as recited in claim 1, further comprising a battery pack, wherein the controller is configured to selectively direct power from the energy recovery mechanism to the battery pack.

9. The electrified vehicle as recited in claim 1, wherein:
    when the estimated effective mass of the electrified vehicle is equal to or less than the mass threshold, the controller is configured to determine that the negative wheel torque threshold should not be increased above the original manufacturer-set negative wheel torque threshold.

10. The electrified vehicle as recited in claim 1, wherein the negative wheel torque threshold is a level of negative wheel torque below which the energy recovery mechanism will not cause the vehicle to exhibit undue vibrations or noise.

11. The electrified vehicle as recited in claim 1, wherein the original, manufacturer-set negative wheel torque threshold is a predefined value stored in the controller.

12. A method, comprising:
    applying a negative wheel torque from an energy recovery mechanism to at least one wheel of an electrified vehicle at a level up to a negative wheel torque threshold; and
    increasing the negative wheel torque in excess of an original, manufacturer-set negative wheel torque threshold when an estimated effective mass of the electrified vehicle exceeds a mass threshold,
    wherein the energy recovery mechanism is a regenerative braking system configured to selectively resist rotation of at least one wheel of the electrified vehicle.

13. The method as recited in claim 12, wherein the estimated effective mass of the electrified vehicle is determined by comparing a negative wheel torque level to a level of deceleration of the electrified vehicle.

14. The method as recited in claim 12, wherein the estimated effective mass of the electrified vehicle is determined by identifying whether a trailer is attached to the electrified vehicle.

15. The method as recited in claim 12, wherein:
    the method further comprises determining that the negative wheel torque threshold should not be increased above the original manufacturer-set negative wheel torque threshold when the estimated effective mass of the electrified vehicle is equal to or less than the mass threshold.

16. The method as recited in claim 12, wherein, when a braking request cannot be fully met by applying negative wheel torque at the negative wheel torque threshold, the method includes applying friction braking to meet the braking request.

17. The method as recited in claim 12, wherein the mass threshold is either (1) an equivalent test weight of the electrified vehicle or (2) a predetermined amount above the equivalent test weight.

* * * * *